United States Patent
Tsou et al.

(10) Patent No.: US 10,550,259 B2
(45) Date of Patent: Feb. 4, 2020

(54) METALLIC ACRYLATE COMPOSITION, PREPARATION METHOD THEREOF, AND RESINS COMPRISING THE SAME

(71) Applicant: SUNKO INK CO., LTD., Taichung (TW)

(72) Inventors: Chiu-Peng Tsou, Taichung (TW); Wen-Wei Cheng, Taichung (TW); Kuan-Jung Chiu, Taichung (TW); Ting-Ti Huang, Taichung (TW)

(73) Assignee: SUNKO INK CO., LTD., Taichung (TW)

( * ) Notice: Subject to any disclaimer, the term of this patent is extended or adjusted under 35 U.S.C. 154(b) by 101 days.

(21) Appl. No.: 16/018,597

(22) Filed: Jun. 26, 2018

(65) Prior Publication Data

US 2019/0390052 A1    Dec. 26, 2019

(51) Int. Cl.
| | |
|---|---|
| *C08L 33/02* | (2006.01) |
| *C08L 27/18* | (2006.01) |
| *C08L 57/00* | (2006.01) |
| *C08K 5/14* | (2006.01) |
| *C08F 4/52* | (2006.01) |

(52) U.S. Cl.
CPC .............. *C08L 33/02* (2013.01); *C08F 4/52* (2013.01); *C08K 5/14* (2013.01); *C08L 27/18* (2013.01); *C08L 57/00* (2013.01); *C08F 2800/20* (2013.01); *C08L 2205/03* (2013.01)

(58) Field of Classification Search
CPC .......... C08L 33/02; C08L 27/18; C08L 57/00; C08L 2205/03; C08K 5/14; C08K 4/52; C08K 2800/20
USPC ........................................................ 524/556
See application file for complete search history.

(56) References Cited

U.S. PATENT DOCUMENTS

| | | | | |
|---|---|---|---|---|
| 6,278,010 B1 * | 8/2001 | Tsou | ........................ | C07F 3/003 556/131 |
| 7,897,663 B2 * | 3/2011 | Tsou | ..................... | C08K 5/1575 252/8.91 |
| 10,221,265 B2 * | 3/2019 | Chiu | ........................ | C07C 57/04 |
| 2016/0326196 A1 * | 11/2016 | Chiu | ........................ | C07C 57/04 |

FOREIGN PATENT DOCUMENTS

EP    2940023 A1 *  11/2015

* cited by examiner

*Primary Examiner* — Michael Bernshteyn
(74) *Attorney, Agent, or Firm* — WPAT, PC

(57) ABSTRACT

A metallic acrylate composition comprises a metallic acrylate and a dispersant, wherein the content of the dispersant is in the range from 0.1 weight percent to 5 weight percent based on the total weight of the metallic acrylate composition, and the metallic acrylate has the structure represented by Formula (I) or Formula (II) as follows:

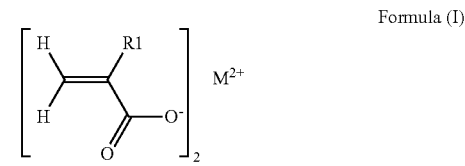

Formula (I)

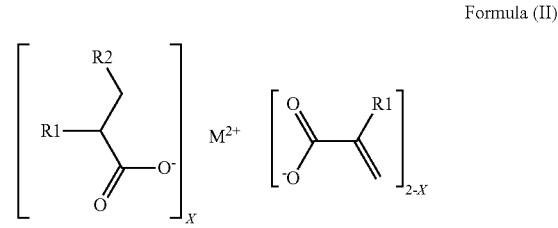

Formula (II)

wherein in Formula (I) and Formula (II), X is larger than 0 and less than 2, and $M^{2+}$ is zinc ion ($Zn^{2+}$), magnesium ion ($Mg^{2+}$) or calcium ion ($Ca^{2+}$);
R1 is a hydrogen group or a saturated alkyl group; and
R2 is

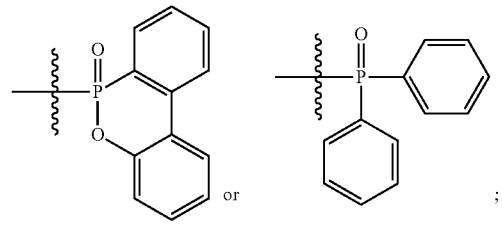

and
the dispersant is polytetrafluoroethylene (PTFE) wax or PTFE-modified polyethylene wax.

16 Claims, No Drawings

METALLIC ACRYLATE COMPOSITION, PREPARATION METHOD THEREOF, AND RESINS COMPRISING THE SAME

BACKGROUND OF THE INVENTION

1. Field of the Invention

The present invention relates to a metallic crosslinking coagent composition applied in resins, and more particularly to a well dispersed metallic acrylate composition, a preparation method of the metallic acrylate composition, and resin compositions comprising the metallic acrylate composition.

2. Description of the Prior Arts

Metallic acrylate, a common metallic crosslinking coagent, can be used for a rubber composition with a peroxide curing agent during vulcanization, Metallic acrylate significantly enhances the performance of a variety of polymers including: can also be used as a modifier in synthesizing resin. The metallic acrylate can improve the hardness, compression and resilience, increase the affinity between material and metal, enhance compatibility between materials, and improve mechanical strength, stretchability, heat resistance, abrasion resistance, solvent resistance, tear strength and metal adhesion between plastic materials. As a result, it is widely added into plasticized molded products such as golf balls, rollers, sealing strips, cables, belts, construction materials and so on.

The structure of common metallic acrylate is shown as follows:

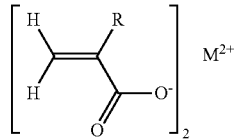

$M^{2+}$ is a divalent metal ion, and R is a hydrogen group (—H) or a methyl group (—CH$_3$).

Common metallic acrylates are, for example, zinc diacrylate (ZDA), calcium diacrylate, zinc dimethacrylate (ZDMA) and fatty acid modified zinc diacrylate. The related commercial products, such as Dymalink 633, Dymalink 634, Dymalink 705 and Dymalink 706 sold by CRAY VALLEY; K-CURE 339, K-CURE 439, K-CURE 633 and K-CURE 634 sold by SUNKO INK; ZN-DA 90 and ZN-DA 100 sold by Nippon Shokubai Co., Ltd., and so on. For its applications and manufacturing methods, please refer to, for example, TW 530062, JP Sho 58-14416, JP Hei 4-10463, JP 4,041,175, JP 4,286,018, JP 4,398,157, U.S. Pat. Nos. 5,789,616, 6,278,010 and 7,217,829, which disclose the different preparation methods and applications of metallic acrylates and disclose that the metallic acrylates modified with fatty acid have an improved thermal stability.

According to the disclosures of TW 544015, a metallic acrylate containing an organophosphorus-oxygen functional group is shown as follows, which is beneficial to improve the compatibility between the resin composition containing the same and the organophosphorus flame retardant.

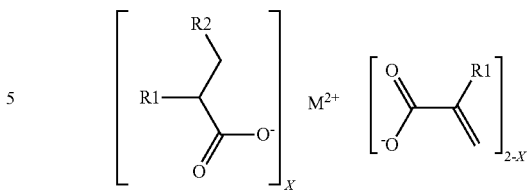

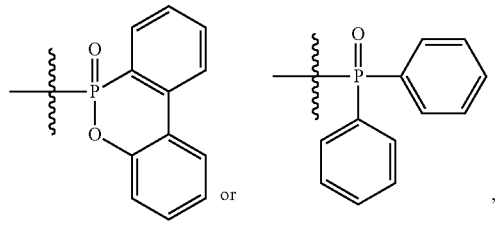

$M^{2+}$ is a divalent metal ion, R1 is a hydrogen group or a saturated alkyl group, R2 is and X is larger than 0 and less than 2.

However, the metallic acrylate powder is apt to self-polymerization at high temperature and aggregation in the presence of moisture, resulting in aggregation and agglomeration caused by compaction after being deposited or stacked for a long period of time, especially more obvious for the metallic acrylate powder with the smaller particle size.

In general, when the metallic acrylate powder is agglomerated, it is less likely to be dispersed in the rubber, and the agglomerated metallic acrylate powder is apt to self-polymerization during the mixing due to frictional heating, and thereby attaching more metallic acrylate powder. Besides, plate-out often occurs on the metal surface of the device and is difficult to remove, which results in white spots or flaws on the rubber surface once peeled off and affecting the quality. Therefore, the self-polymerization problem of metallic acrylate powder still needs to be improved.

Taking JP 2004231573 as an example, said JP patent discloses a method of dispensing metallic acrylate powder in small units of 1 to 15 kilograms, and protecting it against compaction by a cardboard box, so as to maintain fluidity of the metallic acrylate powder. However, the invention requires so many packaging materials and a longer time for handling and disassembly.

U.S. Pat. No. 6,194,504 discloses a method of coating an anti-scorching agent and a rubber on the surface of a metallic acrylate powder with a solvent, the rubber can be polybutadiene, hydroxy-terminated polybutadiene, polybutadiene dimethacrylate, polybutene and ethylene-propylene-diene terpolymer (EPDM). The metallic acrylate powder coated with the anti-scorching agent and the rubber is then mixed with rubber by a two-roll mill or a banbury after drying, so as to solve the problem of plate-out. However, the method easily leaves residual solvents, resulting in a high content of volatile organic compounds (VOCs), and the problem of agglomeration of metallic acrylate powders that may self-polymerize due to temperature or pressure during storage or shipping cannot be overcome as desired.

U.S. Pat. No. 7,135,514 and US 2013/025314 A1 disclose by way of pre-mixing and mixing butadiene rubber and zinc diacrylate powder, add fatty acid zinc salts, metal oxides, low molecular weight polyethylene, fatty acids and other additives in the process to disperse zinc diacrylate powder for processing granulation. U.S. Pat. No. 9,567,449 proposes to pre-disperse zinc diacrylate powder by oil processing. Although adding the process of mixing or pre-dispersing is beneficial to improve the dispersibility of the acrylate powder, it also limits the applicability of adjusting the formulation.

The foresaid fatty acid metal salts, metal oxides, low molecular weight polyethylene, hydrophilic fume silica and hydrophobic fume silica are common dispersing additives used for improving fluidity and dispersibility of the powder, but it remains to be evaluated whether it alleviates aggregation and agglomeration of the metallic acrylate powder due to temperature or compaction.

SUMMARY OF THE INVENTION

To overcome the shortcomings, the present invention provides metallic acrylate compositions and a preparation method thereof to alleviate aggregation and agglomeration of the metallic acrylate powder due to temperature or compaction in storage or delivery.

The present invention provides a metallic acrylate composition, which comprises a metallic acrylate having the structure represented by Formula (I) or Formula (II) as follows:

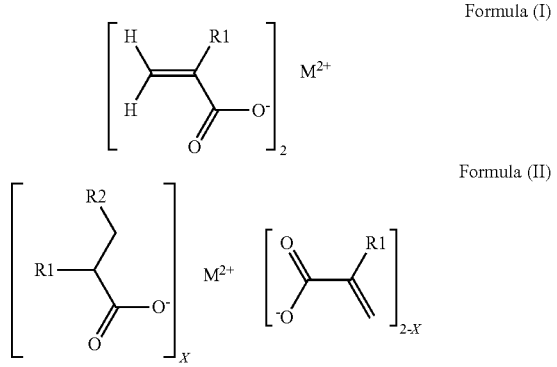

wherein in Formula (I) and Formula (II), X is larger than 0 and less than 2, and $M^{2+}$ is zinc ion ($Zn^{2+}$), magnesium ion ($Mg^{2+}$) or calcium ion ($Ca^{2+}$);

R1 is a hydrogen group or a saturated alkyl group; and R2 is

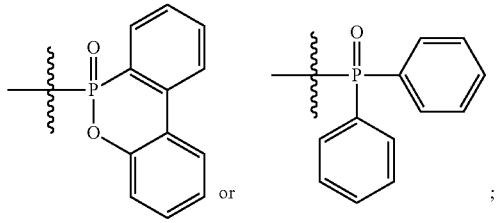 [SMILES: *P1(=O)Oc2ccccc2-c2ccccc21 ; *P(=O)(c1ccccc1)c1ccccc1]

and a dispersant being polytetrafluoroethylene (PTFE) wax or PTFE-modified polyethylene wax, and the content of the dispersant being in the range from 0.1 weight percent to 5 weight percent based on the total weight of the metallic acrylate composition.

The PTFE waxes suitable for the present invention are, for example, but not limited to, commercial product L-5F (CAS No. 9002-84-0, average particle diameter 5 m) produced by AIKIN INDUSTRIES, LTD or DEUREX® F6001 (Solid 60%, is PTFE dispersed in water) produced by DEUREX AG.

PTFE-modified polyethylene waxes suitable for the present invention are, for example, but not limited to, commercial product ACumist® 3405 (average particle diameter 4.5-5.5 μm, fine powder PTFE modified polyethylene homopolymer wax) produced by Honeywell International, Inc.; or DEUREX® F61A (average particle diameter <150 μm, PTFE double-layer wax), DEUREX® F62A (average particle diameter <150 μm, PTFE double-layer wax), DEUREX® F63A (average particle diameter <150 m, PTFE spot-coated wax) or DEUREX® F64A (average particle diameter <150 m, PTFE eco-friendly coated wax) produced by DEUREX AG.

By the above technical means, the metallic acrylate composition would not self-agglomerate due to temperature or heavy pressure in the long-term storage and transport, and has both an improved stability and a good dispersibility in the resin.

Preferably, the saturated alkyl group is, but not limited to, a saturated alkyl group having a carbon number of 1 to 6, for example, methyl ($-CH_3$) or ethyl ($-C_2H_5$).

Preferably, X in Formula (II) is larger than 0 and less than or equal to 1.

The present invention also provides a resin composition comprising a polymer and the metallic acrylate composition.

Specifically, taking the weight of the polymer as 100 parts, the amount of the metallic crosslinking auxiliary agent is 1 part to 50 parts. Preferably, the amount of the metallic crosslinking auxiliary agent is 5 parts to 40 parts. More preferably, the amount of the metallic crosslinking auxiliary agent is 15 parts to 30 parts.

The acrylate composition can be added to various resins to form a resin composition, and the acrylate composition has a good dispersibility in the resin composition. Even replaced with other resin compositions, the acrylate composition can still have a good dispersibility; it is less likely to stick to the device or agglomerate powder on the surface of the finished product during the mixing process. In addition, the acrylate composition can also increase the crosslinking degree of the resin, and thus improve the machinery strength and the utilization of the final resin product.

In addition, the resin composition contains a neodymium catalyst, a nickel catalyst, a cobalt catalyst or a lithium catalyst.

The polymer in the resin composition can be a vulcanized polymer. The suitable vulcanized polymers include, for example, polyolefin, ethylene-α-olefin copolymer, ethylene-α-olefin-nonconjugated diene copolymer, polyethylene (PE), ethylene propylene rubber (EP), ethylene propylene diene monomer (EPDM), polybutene rubber (BR), polyisobutylene rubber (IIR), natural rubber (NR), polyisoprene rubber (IR), styrene-butadiene-styrene block copolymer (SBS), styrene-isoprene-styrene block copolymer (SIS), styrene butadiene rubber (SBR), hydrogenated styrene butadiene styrene block polymer (SBS-SEBS), nitrile rubber (NBR), polyolefin elastomer (POE) or any mixture thereof.

The polyethylene includes low-density polyethylene (LDPE), linear low-density polyethylene (LLDPE), or high-density polyethylene (HDPE) and so on.

The organic peroxides include, but not limited to, alkyl peroxides, dialkyl peroxides, aromatic peroxides, peroxyesters, peroxyketals, acyl peroxides or peroxydicarbonates.

More specifically, the alkyl peroxides may be, but not limited to, tert-butyl-hydroperoxide, tert-amyl-hydroperoxide or 2,5-dimethyl-hexane-2,5-dihydroperoxide. The dialkyl peroxides may be, but not limited to, di-tert-butyl-hydroperoxide, di-tert-amyl-hydroperoxide, 2,5-bis(tert-butylperoxy)-2,5-dimethylhexane or 2,5-dimethyl-2,5-di (tert-butylperoxy)-hexyne-3. The aromatic peroxides may be, but not limited to, dicumyl peroxide, benzoyl peroxide, cumene peroxide, diisopropylbenzene hydroperoxide, tert-butyl peroxybenzoate, di(tert-butylperoxyisopropyl)benzene, or di(4-methyl benzoyl) peroxide. The peroxyesters may be, but not limited to, tert-butyl peroxybenzoate, tert-amyl peroxybenzoate, tert-butyl peroxyacetate, tert-butyl monoperoxymaleate, tert-butyl peoxypivalate, tert-butyl peroxyneodecanoate, tert-amyl peroxyneodecanoate, tert-butyl peroxy-2-ethylhexanoate, tert-butyl peroxyisobutyrate), tert-butyl peroxyneoheptanoate, tert-butyl peroxy-3,5,5-trimethylhexanoate, tert-butyl peroxy-2-ethylhexyl carbonate, tert-amyl peroxy-2-ethylhexyl carbonate or 2,5-dimethyl-2,5-di (2-ethylhexanoylperoxy)hexane. The diperoxyketals can be, but not limited to, 3,6,9-triethyl-3,6,9-trimethyl-1,4,7-triperoxonane, 1,1-bis(tert-butylperoxy)-3,3,5-trimethylcyclohexane, 1,1-bis(tert-butylperoxy) cyclohexane or 2,2-di(tert-butylperoxy)butane. The diacyl peroxides can be, but not limited to, benzoyl peroxide, bis(3,5,5-trimethyl-1-oxo-hexyl)peroxide or dilauroyl peroxide. The peroxydicarbonates can be, but not limited to, bis (2-ethylhexyl) peroxydicarbonate, bis(4-tert-butyl-cyclohexyl) peroxydicarbonate, dimyrityl peroxyldicarbonate or dicetyl peroxyducarbonate.

Preferably, the preparation method of the metallic acrylate composition comprises the steps of:

reacting acrylic acid and a divalent metal oxide in a nonpolar solvent to obtain a first mixture;

adding PTFE wax or PTFE-modified polyethylene wax to the first mixture to obtain the metallic acrylate composition.

Preferably, the acrylic acid is reacted with the divalent metal oxide at a temperature between 30° C. and 100° C.; more preferably, the acrylic acid and the divalent metal oxide are reacted at a temperature between 40° C. to 80° C.

In the preparation method, the preferable acrylic acid may be, but not limited to, for example, 2-propenoic acid, 2-methylpropenoic acid, 2-ethylpropenoic acid, 2-propylpropenoic acid, 2-butylpropenoic acid, 2-pentylpropenoic acid or 2-hexylpropenoic acid.

In the preparation method, the divalent metal oxides may be, for example, zinc oxide, magnesium oxide, calcium oxide, zinc hydroxide, magnesium hydroxide or calcium hydroxide.

In the preparation method, the molar ratio of the acrylic acid to the divalent metal oxide is between 1.4:1 and 2.1:1. Preferably, the molar ratio of the acrylic acid to the divalent metal oxide is between 1.85:1 to 2.05:1.

In the preparation method, the nonpolar solvent refers to a hydrocarbon-based solvent having a boiling point of 50° C. to 150° C. under normal pressure; the nonpolar solvent may be, but not limited to, benzene, toluene, xylene, cyclohexane, hexane, heptane or octane.

Preferably, the preparation method of the metallic acrylate composition comprises:

reacting the metallic acrylate and the organophosphorus oxide in a nonpolar solvent to obtain a first mixture;

adding PTFE wax or PTFE-modified polyethylene wax to the first mixture to obtain the metallic acrylate composition.

Preferably, the metallic acrylate composition is reacted with the organophosphorus oxide at a temperature between 30° C. and 100° C. More preferably, the metallic acrylate composition is reacted with the organophosphorus oxide at a temperature between 40° C. to 80° C.

Preferably, in the preparation method, the metallic acrylates may be, but not limited to, zinc acrylate, zinc dimethylacrylate, zinc diethylacrylate, zinc dipropylacrylate, zinc dibutylacrylate, zinc dipentylacrylate, zinc dihexylacrylate, magnesium acrylate, magnesium dimethacrylate, magnesium diethylacrylate, magnesium dipropylacrylate, magnesium dibutylacrylate, magnesium dipentylacrylate, magnesium dihexylacrylate, calcium acrylate, calcium dimethylacrylate, calcium diethylacrylate, calcium dipropylacrylate, calcium dibutylacrylate, calcium dipentylacrylate, or calcium dihexylacrylate.

In the preparation method, the organophosphorus oxide may be, but not limited to, 9,10-dihydro-9-oxa-10-phosphaphenanthrene-10-oxide or diphenylphosphine oxide.

In the preparation method, the molar ratio of the metallic acrylate composition to the organophosphorus oxide is between 1:0.05 and 1:2; preferably, the molar ratio of the metallic acrylate composition to the organophosphorus oxide is between 1:0.1 and 1:0.9.

Depending on the different application requirements, the metallic acrylate, the organophosphorus oxide and the at least one auxiliary agent may be reacted in a nonpolar solvent, and the at least one auxiliary agent includes a surfactant, an antioxidant, an inhibitor or a lubricant.

For example, the addition of a surfactant can improve dispersibility, for example, polyoxyethylene alkyl ether, sorbitan fatty acid ester, polyoxyethylene sorbitan fatty acid ester, silicon oil, sodium alkylbenzensulfonate, and sodium dioctyl sulfosuccinate and so on. The addition of an antioxidant may inhibit or prevent oxidative destruction of the elastomer, and inhibit or prevent the reaction initiated by oxygen radicals, for example, quinoline antioxidants, amine antioxidants, phenolic antioxidants and sulfur antioxidants, etc, including: product of N-phenylaniline reacted with 2,4,4-trimethylpentene (CAS No. 68411-46-1), 2,6-di-tert-butyl-4-methyl-phenol, 2,2'-methylene-bis (6-tert-butyl-4-methylphenol), 2-methyl-4,6-bis(octylsulfanylmethyl)phenol. The addition of an inhibitor can slow the coking time, for example, hydroquinone monomethylether, 2,6-di-tert-butyl-4-(dimethylaminomethyl) phenol, 2,2,6,6-tetramethylpiperidinooxy. The lubricant added can be, but not limited to, fatty acids, fatty acid metal salts, or low molecular weight polyethylene.

DETAILED DESCRIPTION OF THE PREFERRED EMBODIMENTS

Hereinafter, embodiments and their yields of the metallic acrylate compositions of several examples will be exemplified, and the structure and thermal properties of the metallic acrylate compositions of the examples are characterized by means of Proton Nuclear Magnetic Resonance ($^1$H-NMR), Fourier Transform Infrared Spectroscopy (FTIR) and Differential Scanning Calorimeter (DSC).

1. Yield: The theoretical weight of the target metallic acrylate composition was calculated based on the limiting reagent of the divalent metal oxide or the divalent metal hydroxide in each example and comparative example, and the actual weight of the product obtained after purification and drying was divided by the theoretical weight and then multiplied by 100% to obtain the yield (unit:%).

2. Fourier Transform Infrared Spectroscopy (FTIR) Measurement: The measurements were performed on a Thermo Nicolet 330FT-IR, the sample and potassium bromide (KBr) were mixed at a weight ratio of 1:50 to 1:100, and then fully ground and pressed into ingots in an agate grind for FTIR testing. The scan range was between 4000 cm$^{-1}$ and 450 cm$^{-1}$, so as to identify the characteristic functional group of the analyte.

3. Proton Nuclear Magnetic Resonance Spectroscopy ($^1$H-NMR): The measurements were performed on Varian NMR-400 under a magnetic field of 400 MHz. After the sample was dispersed with chloroform-deuteride (CDCl$_3$) as solvent, trace dimethyl sulfoxide-d6 (d$_6$-DMSO) was added to dissolve the sample for testing. In the NMR spectroscopic analysis results described below, s represents a singlet; br. s represents a broad singlet; d represents a doublet; t represents a triplet; q represents a quartet; dd represents a doublet of doublets; td represents a triplet of doublets; m represents a multiplet; br. represents a broad absorption peak; and J represents the coupling constant in unit of Hertz (Hz).

4. Differential Scanning Calorimetry (DSC) Measurement: The measurement was carried out with a DSC821e (Mettler Toledo®) at a nitrogen flow rate of 80 ml per minute, from room temperature to 290° C. at a heating rate of 10° C. per minute, to measure the endothermic peak of the powder, endothermic onset, endothermic endset and enthalpy change, as well as the exothermic peak, exothermic onset and enthalpy change. In the DSC analysis results described below, br. s represents a broad singlet; br. d represents a broad doublet; and br. m represents a broad multiplet.

Example 1: Metallic Acrylate Composition
(Containing 0.3 wt % PTFE Wax as Dispersant)

2000 ml of toluene, 586.4 g (7.24 moles) of zinc oxide, 102.3 g (0.36 moles) of stearic acid and 4.8 g of nonionic surfactant (trade name Sinopl 1807) were added into a 6 liter stainless steel reaction vessel, then heated to 50±5° C. after mixing; next, 1048 g (14.55 moles) of acrylic acid (purchased from Taiwan Plastics Industry Co., Ltd, containing 200±20 ppm hydroquinone monomethyl ether) was added and then stirred for 2 hours to obtain a first mixture.

The first mixture was subjected to vacuum distillation to remove the water produced by the reaction and to recover the toluene. Drying of the mixture was continued until the water content was less than 2000 ppm after the vacuum degassing. After cooling to room temperature, 4.85 g of PTFE wax (L.-5F produced by AIKIN INDUSTRIES, LTD.: CAS No. 9002-84-0, average particle diameter 5 m) was added as a dispersant and then stirring was continued for 2 hours to obtain a second mixture.

The second mixture was taken out of the reaction vessel and was disintegrated through a RT-25 airflow ultrafine high-speed pulverizer to obtain 1571 g of white powdery product, which was the metallic acrylate composition of Example 1 containing 0.3 wt % dispersant.

The total theoretical weight of the product was 1618 g with a yield of 97.1%; DSC measured from an endothermic onset of 107.57° C. to an endothermic endset of 117.22° C., the endothermic peak (br. s) was 114.26° C. and the enthalpy change was −13.67 J/g, the exothermic onset was 206.42° C., the exothermic peak (br. m) was 209.94° C. and the enthalpy change was >103.76 J/g; $^1$H-NMR (400 MHz, CDCl$_3$+d$_6$DMSO) were 66.22 (dd, J=17 Hz, J=2 Hz), 6.04 (dd, J=17 Hz, J=10 Hz), 5.60 (dd, J=10 Hz, J=2 Hz), 2.17 (t, J=7 Hz), 1.47 (m), 1.14 (br.s), 0.76 (t, J=7 Hz); FTIR (KBr) were 22917, 2848, 1662, 1602, 1535, 1443, 1373, 1277, 1070, 980, 936, 829, 711, 674, 603 cm$^{-1}$.

Example 2: Metallic Acrylate Composition
(Containing 0.3 wt % PTFE-Modified PE Wax as Dispersant)

A metallic acrylate composition in Example 2 was prepared substantially in the same way as described in Example 1, and the difference lies in the dispersants.

2000 ml of toluene, 586.4 g (7.24 moles) of zinc oxide, 102.3 g (0.36 moles) of stearic acid and 4.8 g of nonionic surfactant (trade name Sinopl 1830) were added into a 6 liter stainless steel reaction vessel, then heated to 50±5° C. after mixing; next, 1048 g (14.55 moles) of acrylic acid (purchased from Taiwan Plastics Industry Co., Ltd, containing 200±20 ppm hydroquinone monomethyl ether) was added and then stirred for 2 hours to obtain a first mixture.

The first mixture was subjected to vacuum distillation, drying and cooling to room temperature, 4.85 g of PTFE-modified polyethylene wax (DEUREX® F63A: average particle diameter <150 m, PTFE spot-coated wax) was added as a dispersant and then stirring was continued for 2 hours to obtain a second mixture.

The second mixture was taken out of the reaction vessel and was disintegrated through a RT-25 airflow ultrafine high-speed pulverizer to obtain 1569 g of white powdery product, which was the metallic acrylate composition of Example 2 containing 0.3 wt % dispersant.

The total theoretical weight of the product was 1618 g with a yield of 97.0%; DSC measured from an endothermic onset of 106.53° C. to an endothermic endset of 117.20° C., the endothermic peak (br. s) was 113.80° C. and the enthalpy change was −12.62 J/g, the exothermic onset was 206.07° C., the exothermic peak (br. m) was 209.67° C. and the enthalpy change was >90.85 J/g; $^1$H-NMR (400 MHz, CDCl$_3$+d$_6$DMSO) were 66.21 (dd, J=17 Hz, J=2 Hz), 6.05 (dd, J=17 Hz, J=10 Hz), 5.63 (dd, J=10 Hz, J=2 Hz), 2.18 (t, J=7 Hz), 1.47 (m), 1.14 (br. s), 0.77 (t, J=7 Hz); FTIR (KBr) were λ 2917, 2848, 1662, 1602, 1536, 1443, 1373, 1277, 1071, 980, 936, 830, 711, 675, 604 cm$^{-1}$.

Example 3: Metallic Acrylate Composition
(Containing 0.3 wt % PTFE-Modified PE Wax as Dispersant)

A metallic acrylate composition in Example 3 was prepared substantially in the same way as described in Example 1, and the difference lies in the dispersants.

2000 ml of toluene, 586.4 g (7.24 moles) of zinc oxide, 102.3 g (0.36 moles) of stearic acid and 4.8 g of silicone oil were added into a 6 liter stainless steel reaction vessel, then heated to 50±5° C. after mixing; next, 1048 g (14.55 moles) of acrylic acid (purchased from Taiwan Plastics Industry Co., Ltd, containing 200±20 ppm hydroquinone monomethyl ether) was added and then stirred for 2 hours to obtain a first mixture.

The first mixture was subjected to vacuum distillation to remove the water produced by the reaction and to recover the toluene. Drying was continued until the water content was less than 2000 ppm after the vacuum degassing. After cooling to room temperature, 4.85 g of PTFE-modified polyethylene wax (DEUREX® F61A: average particle diameter <150 rpm, PTFE double-layer wax) was added as a dispersant and then stirring was continued for 2 hours to obtain a second mixture.

The second mixture was taken out of the reaction vessel and was disintegrated through a RT-25 airflow ultrafine high-speed pulverizer to obtain 1581 g of white powdery product, which was the metallic acrylate composition of Example 3 containing 0.3 wt % dispersant.

The total theoretical weight of the product was 1618 g with a yield of 97.7%; DSC measured from an endothermic onset of 108.09° C. to an endothermic endset of 117.36° C., the endothermic peak (br. s) was 114.26° C. and the enthalpy change was −12.01 J/g, the exothermic onset was 206.66° C., the exothermic peak (br. m) was 210.24° C. and the enthalpy change was >91.72 J/g; $^1$H-NMR (400 MHz, CDCl$_3$+d$_6$DMSO) were 66.21 (dd, J=17 Hz, J=2 Hz), 6.05 (dd, J=17 Hz, J=10 Hz), 5.63 (dd, J=10 Hz, J=2 Hz), 2.18 (t, J=7 Hz), 1.47 (m), 1.14 (br. s), 0.77 (t, J=7 Hz); FTIR were λ3436 (br.), 2917, 2848, 1662, 1602, 1535, 1443, 1373, 1277, 1070, 980, 936, 829, 711, 674, 612 cm$^{-1}$.

Example 4: Metallic Acrylate Composition (Containing 0.75 wt % PTFE-Modified PE Wax as Dispersant)

A metallic acrylate composition in Example 4 was prepared substantially in the same way as described in Example 3, and the difference lies in the dispersants.

In Example 4, after the first mixture was prepared by the same procedure as in Example 3, the first mixture was subjected to vacuum distillation, drying and cooling to room temperature, 12.2 g of PTFE-modified polyethylene wax (DEUREX® F61A: average particle diameter <150 m, PTFE double-layer wax) was added as a dispersant and then stirring was continued for 2 hours to obtain a second mixture.

The second mixture was taken out of the reaction vessel and was disintegrated through a RT-25 airflow ultrafine high-speed pulverizer to obtain 1584 g of white powdery product, which was the metallic acrylate composition of Example 4 containing 0.75 wt % dispersant.

The total theoretical weight of the product was 1624.7 g with a yield of 97.5%; DSC measured from an endothermic onset of 102.68° C. to an endothermic endset of 114.06° C., the endothermic peak (br. s) was 110.45° C. and the enthalpy change was −12.26 J/g, the exothermic onset was 200.46° C., the exothermic peak (br. m) was 206.09° C., and the enthalpy change was >91.82 J/g; $^1$H-NMR (400 MHz, CDCl$_3$+d$_6$DMSO) were 66.23 (dd, J=17 Hz, J=2 Hz), 6.06 (dd, J=17 Hz, J=10 Hz), 5.63 (dd, J=10 Hz, J=2 Hz), 2.20 (t, J=7 Hz), 1.50 (m), 1.16 (br. s), 0.78 (t, J=7 Hz); FTIR were λ 3436 (br.), 2918, 2849, 1647, 1602, 1536, 1443, 1373, 1277, 1070, 980, 935, 830, 710, 676, 611 cm$^{-1}$.

Example 5: DOPO-Modified Metallic Acrylate Composition (Containing 0.1 wt % PTFE Wax as Dispersant)

An metallic acrylate composition in Example 5 was prepared substantially in the same way as described in Example 1, and the difference lies in the species and amounts of reactants, dispersants, and reaction conditions.

2000 ml of toluene, 1245 g (5.2 moles) of modified zinc diacrylate powder (K-CURE339), 373.2 g 9,10-dihydro-9-oxa-10-phosphaphenanthrene-10-oxide (abbreviated as DOPO), the reactant was heated to 65° C. to 75° C. after uniformly stirred, and then stirred for 1 hour to obtain a first mixture.

The first mixture was subjected to vacuum distillation, drying and cooling to room temperature, 1.6 g of PTFE-modified polymeric wax (L-5F produced by AIKIN INDUSTRIES, LTD.: CAS No. 9002-84-0, average particle diameter 5 μm) was added as a dispersant and then stirring was continued for 2 hours to obtain a second mixture.

The second mixture was taken out of the reaction vessel and was disintegrated through a RT-25 airflow ultrafine high-speed pulverizer to obtain 1576 g of white powdery product, which was the metallic acrylate composition of Example 5 containing 0.1 wt % dispersant.

The total theoretical weight of the product was 1620 g with a yield of 97.0%; DSC measured from an endothermic onset of 98.75° C. to an endothermic endset of 110.74° C., the endothermic peak (br. d) was 107.93° C. and the enthalpy change was −10.03 J/g, the exothermic onset was 211.67° C., the exothermic peak (br. s) was 238.46° C. and the enthalpy change was >178.37 J/g; $^1$H-NMR (400 MHz, CDCl$_3$+d$_6$DMSO) were 67.85-7.56 (m), 7.48 (t, J=7.8 Hz), 7.32-6.80 (m), 6.62 (d, J=12 Hz), 6.05 (d, J=20 Hz), 5.90 (dd, J=18 Hz, J=8 Hz), 5.46 (d, J=8 Hz), 2.50-1.80 (m), 1.50-1.25 (m), 1.02 (br. s), 0.64 (t, J=3.2 Hz); FTIR (KBr) were λ3396 (br.), 2917, 2848, 1644, 1541, 1440, 1371, 1276, 1140, 1093, 1057, 1039, 986, 831, 760, 674, 531 cm$^{-1}$.

Example 6: DOPO-Modified Metallic Acrylate Composition (Containing 3 wt % PTFE Wax as Dispersant)

A metallic acrylate composition in Example 6 was prepared substantially in the same way as described in Example 5, and the difference lies in the amounts of dispersants.

In Example 6, after the first mixture was prepared by the same procedure as in Example 5, 48.6 g of PTFE-modified polymeric wax (L-5F produced by AIKIN INDUSTRIES, LTD.: CAS No. 9002-84-0, average particle diameter 5 μm) was added as a dispersant and then stirring was continued for 2 hours to obtain a second mixture.

The second mixture was taken out of the reaction vessel and was disintegrated through a RT-25 airflow ultrafine high-speed pulverizer to obtain 1585 g of white powdery product, which was the metallic acrylate composition of Example 6 containing 3 wt % dispersant.

The total theoretical weight of the product was 1620 g with a yield of 98.0%; DSC measured from an endothermic onset of 98.30° C. to an endothermic endset of 110.24° C., the endothermic peak (br. d) was 107.27° C. and the enthalpy change was −10.75 J/g, the exothermic onset was 227.71° C., the exothermic peak (br. s) was 244.39° C., and the enthalpy change was >146.63 J/g; $^1$H-NMR (400 MHz, CDCl$_3$+d$_6$DMSO) were 67.85-7.58 (m), 7.50 (t, J=8 Hz), 7.32-6.80 (m), 6.64 (d, J=28 Hz), 6.06 (d, J=20 Hz), 5.90 (dd, J=16 Hz, J=12 Hz), 5.47 (d, J=12 Hz), 2.50-1.80 (m), 1.50-1.25 (m), 1.03 (br. s), 0.66 (t, J=4 Hz); FTIR (KBr) were λ 3404 (br.), 2917, 2848, 1644, 1541, 1438, 1370, 1276, 1209, 1154, 1094, 1058, 1038, 986, 831, 760, 673, 532 cm$^{-1}$.

Example 7: DOPO-Modified Metallic Acrylate Composition (Containing 5 wt % PTFE Wax as Dispersant)

A metallic acrylate composition in Example 7 was prepared substantially in the same way as described in Example 5, and the difference lies in the amounts of dispersants.

In Example 7, after the first mixture was prepared by the same procedure as in Example 5, 81.0 g of PTFE-modified polymeric wax (L-5F produced by AIKIN INDUSTRIES, LTD.: CAS No. 9002-84-0, average particle diameter 5 m) was added as a dispersant and then stirring was continued for 2 hours to obtain a second mixture.

The second mixture was taken out of the reaction vessel and was disintegrated through a RT-25 airflow ultrafine high-speed pulverizer to obtain 1583 g of white powdery product, which was the metallic acrylate composition of Example 7 containing 5 wt % dispersant.

The total theoretical weight of the product was 1620 g with a yield of 97.0%; DSC measured from an endothermic onset of 98.30° C. to an endothermic endset of 109.71° C., the endothermic peak (br. d) was 106.92° C. and the enthalpy change was −10.88 J/g, the exothermic onset was 221.20° C., the exothermic peak (br. s) was 234.93° C., and the enthalpy change was >194.32 J/g; $^1$H-NMR (400 MHz, $CDCl_3+d_6DMSO$) were 67.90-7.60 (m), 7.51 (t, J=8 Hz), 7.34-6.80 (m), 6.66 (d, J=28 Hz), 6.08 (d, J=20 Hz), 5.92 (dd, J=18 Hz, J=8 Hz), 5.49 (d, J=8 Hz), 2.50-1.80 (m), 1.50-1.25 (m), 1.05 (br. s), 0.66 (m); FTIR (KBr) were λ 3400 (br.), 2917, 2848, 1644, 1541, 1439, 1371, 1276, 1209, 1154, 1094, 1057, 1038, 986, 831, 760, 672, 605, 574, 528 $cm^{-1}$.

Example 8: DOPO-Modified Metallic Acrylate Composition (Containing 0.1 wt % PTFE-Modified PE Wax as Dispersant)

A metallic acrylate composition in Example 8 was prepared substantially in the same way as described in Example 5, and the difference lies in the species of dispersants.

In Example 8, after the first mixture was prepared by the same procedure as in Example 5, 1.6 g of PTFE-modified polyethylene wax (DEUREX® F61A: average particle diameter <150 μm, PTFE double-layer wax) was added as a dispersant and then stirring was continued for 2 hours to obtain a second mixture.

The second mixture was taken out of the reaction vessel and was disintegrated through a RT-25 airflow ultrafine high-speed pulverizer to obtain 1590 g of white powdery product, which was the metallic acrylate composition of Example 8 containing 0.1 wt % dispersant.

The total theoretical weight of the product was 1620 g with a yield of 98.0%; DSC measured from an endothermic onset of 102.33° C. to an endothermic endset of 109.75° C., the endothermic peak (br. d) was 106.93° C. and the enthalpy change was −6.56 J/g, the exothermic onset was 211.50° C., the exothermic peak (br. s) was 241.55° C., and the enthalpy change was >171.95 J/g; $^1$H-NMR (400 MHz, $CDCl_3+d_6DMSO$) were 67.86-7.58 (m), 7.50 (t, J=7.8 Hz), 7.35-6.80 (m), 6.64 (d, J=28 Hz), 6.07 (d, J=16 Hz), 5.91 (dd, J=18 Hz, J=8 Hz), 5.48 (d, J=8 Hz), 2.50-1.60 (m), 1.50-1.25 (m), 1.04 (br. s), 0.66 (m); FTIR were λ 3400 (br.), 2917, 2848, 1644, 1541, 1440, 1371, 1276, 1140, 1093, 1057, 1038, 986, 830, 760, 676, 532 $cm^{-1}$.

Example 9: DOPO-Modified Metallic Acrylate Composition (Containing 3 wt % PTFE-Modified PE Wax as Dispersant)

A metallic acrylate composition in Example 9 was prepared substantially in the same way as described in Example 8, and the difference lies in the amount of dispersants.

In Example 9, after the first mixture was prepared by the same procedure as in Example 8, 48.6 g of PTFE-modified polyethylene wax (DEUREX® F61A: average particle diameter <150 μm, PTFE double-layer wax) was added as a dispersant and then stirring was continued for 2 hours to obtain a second mixture.

The second mixture was taken out of the reaction vessel and was disintegrated through a RT-25 airflow ultrafine high-speed pulverizer to obtain 1580 g of white powdery product, which was the metallic acrylate composition of Example 9 containing 3 wt % dispersant.

The total theoretical weight of the product was 1620 g with a yield of 97.0%; DSC measured from an endothermic onset of 95.22° C. to an endothermic endset of 108.29° C., the endothermic peak (br. d) was 104.93° C. and the enthalpy change was −16.12 J/g, the exothermic onset was 217.78° C., the exothermic peak (br. s) was 230.07° C., and the enthalpy change was >131.94 J/g; $^1$H-NMR (400 MHz, $CDCl_3+d_6DMSO$) were 67.86-7.58 (m), 7.49 (t, J=8 Hz), 7.34-6.78 (m), 6.63 (d, J=28 Hz), 6.06 (d, J=16 Hz), 5.90 (dd, J=16 Hz, J=8 Hz), 5.47 (d, J=8 Hz), 2.45-1.80 (m), 1.55-1.25 (m), 1.03 (br. s), 0.65 (m); FTIR (KBr) were λ3380 (br.), 2917, 2848, 1647, 1601, 1541, 1442, 1372, 1277, 1140, 1094, 1057, 1038, 982, 936, 830, 760, 711, 675, 601 $cm^{-1}$.

Example 10: DOPO-Modified Metallic Acrylate Composition (Containing 5 wt % PTFE-Modified PE Wax as Dispersant)

A metallic acrylate composition in Example 10 was prepared substantially in the same way as described in Example 8, and the difference lies in the amount of dispersants.

In Example 10, after the first mixture was prepared by the same procedure as in Example 8, 81.0 g of PTFE-modified polyethylene wax (DEUREX® F61A: average particle diameter <150 μm, PTFE double-layer wax) was added as a dispersant and then stirring was continued for 2 hours to obtain a second mixture.

The second mixture was taken out of the reaction vessel and was disintegrated through a RT-25 airflow ultrafine high-speed pulverizer to obtain 1592 g of white powdery product, which was the metallic acrylate composition of Example 10 containing 5 wt % dispersant.

The total theoretical weight of the product was 1620 g with a yield of 98.0%; DSC measured from an endothermic onset of 92.39° C. to an endothermic endset of 108.02° C., the endothermic peak (br. d) was 104.24° C. and the enthalpy change was −23.97 J/g, the exothermic onset was 223.95° C., the exothermic peak (br. s) was 229.05° C., and the enthalpy change was >141.37 J/g; $^1$H-NMR (400 MHz, $CDCl_3+d_6DMSO$) were 67.80-7.50 (m), 7.44 (t, J=8 Hz), 7.34-6.74 (m), 6.58 (d, J=31 Hz), 6.00 (d, J=17 Hz), 5.84 (dd, J=16 Hz, J=12 Hz), 5.42 (d, J=10 Hz), 2.40-1.70 (m), 1.50-1.20 (m), 0.98 (br. s), 0.60 (t, J=7.2 Hz); FTIR (KBr) λ 3361 (br.), 2917, 2848, 1649, 1603, 1540, 1442, 1372, 1277, 1140, 1093, 1056, 1038, 980, 935, 829, 759, 711, 675, 601, 530 $cm^{-1}$.

Comparative Example 1: Metallic Acrylate Composition (without Dispersant)

A metallic acrylate composition in Comparative Example 1 was prepared substantially in the same way as described in Example 1, and the difference is that the metallic acrylate composition of Comparative Example 1 has no dispersant.

In Comparative Example 1, after the first mixture was prepared by the same procedure as in Example 1, the first mixture was subjected to vacuum distillation, drying and cooling to room temperature, then was disintegrated through a RT-25 airflow ultrafine high-speed pulverizer to obtain 1556 g of white powdery product, which was the metallic acrylate composition of Comparative Example 1 without dispersant.

The total theoretical weight of the product was 1612.5 g with a yield of 96.5%; DSC measured from an endothermic onset of 108.24° C. to an endothermic endset of 118.15° C., the endothermic peak (br. s) was 114.75° C. and the enthalpy change was −13.07 J/g, the exothermic onset was 205.17° C., the exothermic peak (br. m) was 208.78° C. and the enthalpy change was >97.70 J/g; $^1$H-NMR (400 MHz, CDCl$_3$+d$_6$DMSO) were 66.22 (dd, J=17 Hz, J=2 Hz), 6.06 (dd, J=17 Hz, J=10 Hz), 5.64 (dd, J=10 Hz, J=2 Hz), 2.20 (t, J=4 Hz), 1.49 (m), 1.15 (br.s), 0.77 (t, J=8 Hz); FTIR (KBr) λ 2918, 2848, 1941, 1661, 1602, 1536, 1443, 1373, 1277, 1070, 979, 935, 830, 711, 675, 611 cm$^{-1}$.

Comparative Example 2: Metallic Acrylate Composition (Containing 0.75 wt % Hydrophobic Silica Fume as Dispersant)

A metallic acrylate composition in Comparative Example 2 was prepared substantially in the same way as described in Example 4, the difference is that Comparative Example 2 add another dispersant.

In Comparative Example 2, after the first mixture was prepared by the same procedure as in Example 4, the first mixture was subjected to vacuum distillation, drying and cooling to room temperature, then 12.2 g of hydrophobic silica fume (CAB-O-SIL® TS-530 produced by Cabot Corporation: CAS No. 68909-20-6, pH is 4.8 to 7.5, average particle diameter 0.2 μm, surface modified by hexamethyldisilazane) was added as a dispersant and then stirring was continued for 2 hours to obtain a second mixture.

The second mixture was taken out of the reaction vessel and was disintegrated through a RT-25 airflow ultrafine high-speed pulverizer to obtain 1567 g of white powdery product, which was the metallic acrylate composition of Comparative Example 2 containing 0.75 wt % dispersant.

The total theoretical weight of the product was 1624.7 g with a yield of 96.4%; DSC measured from an endothermic onset of 104.45° C. to an endothermic endset of 114.15° C., the endothermic peak (br. s) was 110.98° C. and the enthalpy change was −10.68 J/g, the exothermic onset was 201.17° C., the exothermic peak (br. m) was 206.48° C., and the enthalpy change was >86.60 J/g; $^1$H-NMR (400 MHz, CDCl$_3$+d$_6$DMSO) were 66.22 (dd, J=17 Hz, J=2 Hz), 6.02 (dd, J=17 Hz, J=10 Hz), 5.65 (dd, J=10 Hz, J=2 Hz), 2.18 (t, J=6 Hz), 1.48 (m), 1.14 (br. s), 0.76 (m); FTIR (KBr) were λ 2918, 2848, 1645, 1602, 1536, 1444, 1373, 1276, 1069, 979, 940, 830, 710, 676, 614 cm$^{-1}$.

Comparative Example 3: Metallic Acrylate Composition (Containing 0.75 wt % Hydrophilic Silica Fume as Dispersant)

A metallic acrylate composition in Comparative Example 3 was prepared substantially in the same way as described in Example 4, and the difference is that Comparative Example 3 adds another dispersant.

In Comparative Example 3, after the first mixture was prepared by the same procedure as in Example 4, the first mixture was subjected to vacuum distillation, drying and cooling to room temperature, then 12.2 g of hydrophilic silica fume (CAB-O-SIL® M-5 produced by Cabot Corporation: CAS No. 112945-52-5, pH 3.6 to 4.5, average particle diameter 0.2 jam, without surface modification) was added as a dispersant and then stirring was continued for 2 hours to obtain a second mixture.

The second mixture was taken out of the reaction vessel and was disintegrated through a RT-25 airflow ultrafine high-speed pulverizer to obtain 1560 g of white powdery product, which was the metallic acrylate composition of Comparative Example 3 containing 0.75 wt % dispersant.

The total theoretical weight of the product was 1624.7 g with a yield of 96.0%; DSC measured from an endothermic onset of 105.65° C. to an endothermic endset of 115.48° C., the endothermic peak (br. s) was 112.30° C. and the enthalpy change was −12.43 J/g, the exothermic onset was 201.61° C., the exothermic peak (br. m) was 207.29° C., and the enthalpy change was >104.17 J/g; $^1$H-NMR (400 MHz, CDCl$_3$+d$_6$DMSO) were 66.21 (dd, J=16 Hz, J=2 Hz), 6.03 (dd, J=16 Hz, J=10 Hz), 5.60 (dd, J=12 Hz, J=2 Hz), 2.16 (t, J=8 Hz), 1.46 (m), 1.13 (br. s), 0.74 (m); FTIR (KBr) were λ 3449 (br), 2918, 2848, 1644, 1574, 1523, 1434, 1373, 1275, 1067, 974, 909, 831, 710, 690, 584, 529, 502, 472 cm$^{-1}$.

Comparative Example 4: Metallic Acrylate Composition (Containing 0.75 wt % Fatty Acid Metal Salt as Dispersant)

A metallic acrylate composition in Comparative Example 4 was prepared substantially in the same way as described in Example 4, and the difference is that Comparative Example 4 adds another dispersant.

In Comparative Example 4, after the first mixture was prepared by the same procedure as in Example 4, the first mixture was subjected to vacuum distillation, drying and cooling to room temperature, then 12.2 g of fatty acid metal salt (Aflux®16 produced by Rhein Chemie Corporation: the melting point between 80° C. to 105° C., a combination of natural fatty acid calcium salt and amide ester wax) was added as a dispersant and then stirring was continued for 2 hours to obtain a second mixture.

The second mixture was taken out of the reaction vessel and was disintegrated through a RT-25 airflow ultrafine high-speed pulverizer to obtain 1560 g of white powdery product, which was the metallic acrylate composition of Comparative Example 3 containing 0.75 wt % dispersant.

The total theoretical weight of the product was 1624.7 g with a yield of 96.0%; DSC measured from an endothermic onset of 95.46° C. to an endothermic endset of 110.46° C., the endothermic peak (br. s) was 105.98° C. and the enthalpy change was −10.84 J/g, the exothermic onset was 201.87° C., the exothermic peak (br. m) was 206.25° C., and the enthalpy change was >76.48 J/g; $^1$H-NMR (400 MHz, CDCl$_3$+d$_6$DMSO) were 66.20 (dd, J=16 Hz, J=1.2 Hz), 6.04 (dd, J=16 Hz, J=8 Hz), 5.60 (dd, J=16 Hz, J=0.8 Hz), 2.18 (t, J=8 Hz), 1.47 (m), 1.14 (br. s), 0.76 (t, J=7.2 Hz); FTIR (KBr) were λ 3436 (br), 2918, 2848, 1648, 1600, 1538, 1442, 1372, 1276, 1070, 980, 936, 830, 711, 676, 609 cm$^{-1}$.

Comparative Example 5: DOPO-Modified Metallic Acrylate Composition (without Dispersant)

A metallic acrylate composition in Comparative Example 5 was prepared substantially in the same way as described in Example 5, and the difference is that Comparative Example 5 add no dispersant.

In Comparative Example 5, after the first mixture was prepared by the same procedure as in Example 5, the first mixture was subjected to vacuum distillation, drying and cooling to room temperature, then was disintegrated through a RT-25 airflow ultrafine high-speed pulverizer to obtain 1581 g of white powdery product, which was the metallic acrylate composition of Comparative Example 5 without dispersant.

The total theoretical weight of the product was 1612.5 g with a yield of 98.0%; DSC measured from an endothermic onset of 98.83° C. to an endothermic endset of 109.73° C., the endothermic peak (br. d) was 106.93° C. and the enthalpy change was −12.22 J/g, the exothermic onset was 215.67° C., the exothermic peak (br. s) was 238.07° C., and the enthalpy change was >136.00 J/g; $^1$H-NMR (400 MHz, $CDCl_3+d_6DMSO$) were 67.8-7.7 (m), 7.6-7.4 (m) 7.5 (t, J=7.8 Hz), 7.32 (m), 7.24-7.19 (m), 7.10 (t, J=5.6 Hz), 7.04 (d, J=7.6 Hz), 6.12 (d, J=16.8 Hz), 5.95 (dd, J=18 Hz, J=10 Hz), 5.52 (d, J=10 Hz), 2.39-2.15 (m), 2.02 (t, J=7 Hz), 1.38 (m), 1.01 (br. s), 0.71 (m); FTIR (KBr) were λ3418 (br), 2918, 2848, 1643, 1561, 1434, 1367, 1274, 1199, 1146, 1120, 1062, 987, 921, 832, 760, 672, 598, 528 $cm^{-1}$.

The powdery metallic acrylate compositions shown in Formula (I) or Formula (II) can be prepared by way of the Examples 1 to 10 and Comparative Examples 1 to 5, and the difference between the examples and the comparative examples can be referred to Table 1, wherein the difference is whether the metallic acrylate composition contains the dispersant, the type of the dispersant and the concentration of the dispersant.

Table 1: Comparison of metallic acrylate compositions of Examples 1 to 10 and Comparative Examples 1 to 5

| Metallic Acrylate Composition | The Species of Metallic Acrylate | Dispersant Concentration | Dispersant Species (Trade name) |
|---|---|---|---|
| Example 1 | As Formula(I) | 0.3 wt % | PTFE wax (L-5F) |
| Example 2 | As Formula(I) | 0.3 wt % | PTFE-modified PE wax (DEUREX ® F63A) |
| Example 3 | As Formula(I) | 0.3 wt % | PTFE-modified PE wax (DEUREX ® F61A) |
| Example 4 | As Formula(I) | 0.75 wt % | PTFE-modified PE wax (DEUREX ® F61A) |
| Example 5 | As Formula (II) | 0.1 wt % | PTFE wax (L-5F) |
| Example 6 | As Formula (II) | 3 wt % | PTFE wax (L-5F) |
| Example 7 | As Formula (II) | 5 wt % | PTFE wax (L-5F) |
| Example 8 | As Formula (II) | 0.1 wt % | PTFE-modified PE wax (DEUREX ® F61A) |
| Example 9 | As Formula (II) | 3 wt % | PTFE-modified PE wax (DEUREX ® F61A) |
| Example 10 | As Formula (II) | 5 wt % | PTFE-modified PE wax (DEUREX ® F61A) |
| Comparative Example 1 | As Formula(I) | | no dispersant |
| Comparative Example 2 | As Formula(I) | 0.75 wt % | hydrophobic silica fume (CAB-O-SIL ® TS-610) |
| Comparative Example 3 | As Formula(I) | 0.75 wt % | hydrophilic silica fume (CAB-O-SIL ® M-5) |
| Comparative Example 4 | As Formula(I) | 0.75 wt % | fatty acid metal salt (Aflux ® 16) |
| Comparative Example 5 | As Formula (II) | | no dispersant |

To testify that the metallic acrylate compositions provided by the present invention have a better stability and dispersibility during storage or transport, Test Example 1 was simulated the powdery metallic acrylate compositions which are subjected to heavy pressure during storage or transport; Test Example 2 and Test Example 6 were simulated adding the powdery metallic acrylate compositions to different resin rubbers, and tested the dispersibility, the property of sticking equipment and the property of Surface Agglomeration of the resin compositions; and Test Example 3 to Test Example 5 tested the dispersibility, the property of sticking equipment and the property of Surface Agglomeration of the resin compositions after adding the catalysts.

Test Example 1: Compaction Test of Metallic Acrylate Composition Having Formula (I)

100 g of the metallic acrylate composition powder was weighed in each of the Examples and Comparative Examples and put into an aluminum foil bag having a size of 10 cm×10 cm, the air in the aluminum foil bag was exhausted and then the bag was sealed by heat, and a 4-kilogram flange was placed on the heat-sealed aluminum foil bag then do the compaction test in 50° C. oven, so as to simulate the weight and temperature conditions that the metallic acrylate composition may encounter during the storage or transport. The test time of Test Example 1 is in units of months, and the appearance of the Examples and the Comparative Examples are listed in Table 2.

Table 2: Appearances of the powdery metallic acrylate composition of Examples 1 to 4 and Comparative Examples 1 to 4 before compaction, after one month of compaction and after two months of compaction.

| Metallic Acrylate Composition | Before compaction | After one month of compaction | After two month of compaction |
|---|---|---|---|
| Example 1 | Powder and a little false agglomeration | Mostly agglomerated into small caking, easy to crush | The interior of the central sample agglomerated into caking, easy to crush |
| Example 2 | Powder and a little false agglomeration | Partially agglomerated into small caking, easy to crush | The interior of the central sample agglomerated into caking, easy to crush |
| Example 3 | Powder and a little false agglomeration | Partially agglomerated into small caking, easy to crush | The interior of the central sample agglomerated into caking, easy to crush |
| Example 4 | Powder and a little false agglomeration | Partially agglomerated into small caking, easy to crush | The interior of the central sample agglomerated into caking, easy to crush |
| Comparative Example 1 | Powder and a little false agglomeration | Mostly agglomerated into caking, easy to crush | Agglomerated into compacted caking, hard to crush |
| Comparative Example 2 | Fluffy powder | Mostly agglomerated into caking, easy to crush | The interior of the central sample agglomerated into compacted, slightly hard to crush |
| Comparative Example 3 | Fluffy powder | Mostly agglomerated into caking, easy to crush | The interior of the central sample agglomerated into compacted caking, slightly hard to crush |
| Comparative Example 4 | Powder and a little false agglomeration | Poor initial dispersibility, no compaction test arranged | Poor initial dispersibility, no compaction test arranged |

Test Example 2: Dispersion Test of the Metallic Acrylate Composition Having Formula (I) (Butadiene Rubber Masterbatch)

1. Preparation of the Butadiene Rubber Masterbatch

The gap between the rollers in the two-roll mill (brand: Xufeng, model: HF-2RM) was set to 2.5 mm, and butadiene rubber was uniformly softened and mixed in a two-roll mill in the longitudinal and horizontal directions for 1 minute, followed by adding zinc oxide, zinc stearate, dicumyl peroxide and pigment powder, and then the additives and the butadiene rubber were mixed in a two-roll mill for 5 minutes to 8 minutes, thus forming a mixed butadiene rubber masterbatch. Thereafter, the butadiene rubber masterbatch was rolled to a sheet having a thickness of 2 mm to 3 mm for use.

In the butadiene rubber masterbatch, the contents of the additives were 100 parts by weight of butadiene rubber, 23.2 parts by weight of zinc oxide, 3 parts by weight of zinc stearate, 1.5 parts by weight of diisopropylperoxide benzene and 0.7 parts by weight of pigment powder.

2. Dispersion Test of the Metallic Acrylate Composition in Butadiene Rubber Masterbatch 100 parts by weight of a butadiene rubber masterbatch were added into a brabender (brand: Brabender, model: PL-2100) and mixed at a speed of 19 rpm for 1 minute, and then 18.4 parts by weight of metallic acrylate composition were added then mixed at speed of 100 rpm for 1 minute; next, the speed was adjusted to 22 rpm and mixed for 1 minute to form a butadiene rubber composition, and then the butadiene rubber composition was pressed to form a sheet having a thickness of 2 mm at pressure of 20 kg/cm$^2$. The dispersion results of the metallic acrylate composition with the mixed masterbatch was observed.

After the preparation of cis-butadiene resin composition is completed, the rotor and the inner wall of the brabender were observed by an operator and another person skilled in the art to determine whether any sample was adhered to the rotor and the inner wall and whether any agglomeration or white spot was formed on the surface of the sample. The score was evaluated according to the observation results which are divided into six levels by scores: None (5 points), Slight (4 points), A few (3 points), Partial (2 points), Much (1 point), Serious (0 points). The total scores were summed up from the two persons; the higher the total score demonstrate the better dispersion. The results are shown in Table 3.

Table 3: The results of the metallic acrylate compositions of Examples 1 to 4 and Comparative Examples 1 to 4 mixed with the butadiene rubber masterbatch before and after the compaction to form a rubber composition that adhered to the equipment and agglomerated on the surface As shown in the results of Table 3, the rubber which was added with the metallic acrylate composition of the present invention demonstrates better dispersibility than the rubber which was added with the comparative metallic acrylate composition, and was less likely to stick onto the equipment, and was also less likely to agglomerate after the compaction. Therefore, it is concluded that the product has better stability after the long-term delivery or storage.

Test Example 3: Dispersion Test of the Metallic Acrylate Composition Having Formula (I) (Neodymium-Catalyzed Butadiene Rubber)

In the industry, metallic acrylates are often used with neodymium-catalyzed butadiene rubber, therefore, Test Example 3 mainly tests the dispersibility with neodymium-catalyzed butadiene rubber, the test method of Test Example 3 was similar to Test Example 2, and the neodymium-catalyzed butadiene rubber (trade name CB23) purchased from Lanxess was added.

Besides, in order to observe the dispersion effect of the metallic acrylate composition with beodymium-catalyzed butadiene rubber, after completing preparation of the cis-butadiene rubber composition, it was visually observed the residue of sample onto the rotor and inner wall of the spectrometer, and the agglomeration or any white spots on the surface of the sample after rolling. The results are shown in Table 4 below.

In the same operating and scoring method as in Test Example 2, the prepared metallic acrylate composition was contained in a heat-sealed aluminum foil bag then compacted by a 4-kilogram weight flange at 50° C. oven to simulate the compaction and temperature conditions to the metallic acrylate composition during the delivery or storage. After one month of compaction, the aforementioned procedure of the dispersion test was repeated and the results are shown in Table 4.

Table 4: The metallic acrylate compositions of Examples 1 to 3 and Comparative Example 1 before and after compaction, and the score results of the dispersion with neodymium-catalyzed butadiene rubber masterbatch

| Rubber Formula | Metallic Acrylate Composition | Initial Dispersion Test | | Dispersion Test after one month of compaction | | Dispersion Test after two month of compaction | |
|---|---|---|---|---|---|---|---|
| | | Equipment Adhesion | Surface Agglomeration | Equipment Adhesion | Surface Agglomeration | Equipment Adhesion | Surface Agglomeration |
| butadiene rubber master batch | Example 1 | 9 | 10 | 6 | 8 | 4 | 8 |
| | Example 2 | 9 | 10 | 9 | 10 | 8 | 10 |
| | Example 3 | 9 | 10 | 9 | 10 | 8 | 10 |
| | Example 4 | 9 | 10 | 9 | 10 | 8 | 10 |
| | Comparative Example 1 | 9 | 10 | 2 | 2 | 2 | 2 |
| | Comparative Example 2 | 8 | 10 | 6 | 8 | 4 | 6 |
| | Comparative Example 3 | 4 | 6 | 4 | 6 | 2 | 4 |
| | Comparative Example 4 | 2 | 2 | Untested | | Untested | |

| Neodymium catalyst Butadiene rubber (trade name) | Metallic Acrylate Composition | Initial Dispersion Test | | Dispersion Test after one month of compaction | |
|---|---|---|---|---|---|
| | | Equipment Adhesion | Surface Agglomeration | Equipment Adhesion | Surface Agglomeration |
| CB23 | Example 1 | 6 | 10 | 6 | 10 |
| | Example 2 | 6 | 10 | 6 | 8 |
| | Example 3 | 10 | 10 | 8 | 10 |
| | Comparative Example 1 | 2 | 6 | 2 | 2 |

Test Example 4: Dispersion Test of Metallic Acrylate Composition Having Formula (I) (Nickel-Catalyzed Butadiene Rubber)

In the industry, metallic acrylates are often used with nickel-catalyzed butadiene rubber, so Test Example 4 mainly tests dispersibility with nickel-catalyzed butadiene rubber. The test method is similar to Test Example 2, and the nickel-catalyzed butadiene rubber available from Goodyear (trade name: 1207G) or available from KUMHO (trade name: KBR01) are used.

Also in order to observe the dispersion effect of the metallic acrylate composition of the present invention with nickel-catalyzed butadiene rubber, after the preparation of the cis-butadiene rubber composition was completed, it was visually observed the residue of sample onto the rotor and inner wall of the brabender, and the agglomeration or any white spots on the surface of the sample after rolling, and the visual inspection results are shown in Table 5. In the same method as in Test Example 2, the prepared metallic acrylate composition was contained in a heat-sealed aluminum foil bag then compacted by a 4 kilogram weight flange at 50° C. oven to simulate the compaction and temperature conditions during the delivery or storage. After one month of compaction, the same procedure for the dispersion test was repeated and the results are shown in Table 5.

Table 5: The score results of metallic acrylate compositions of Examples 1 to 3 and Comparative Example 1 before and after compaction were mixed with the nickel-catalyzed butadiene rubber.

Test Example 5: Dispersion Test of Metallic Acrylate Composition Having Formula (I) (Cobalt Catalyzed Butadiene Rubber)

In the industry, metallic acrylates are often used with cobalt-catalyzed butadiene rubber. Therefore, Test Example 5 mainly tests dispersibility with cobalt-catalyzed butadiene rubber. The test method was similar to of the Test Example 2, and the cobalt-catalyzed butadiene rubber available from Lanxess (trade name: CB1221 and CB1203) were used.

Also in order to observe the dispersion effect of the metallic acrylate composition of the present invention with cobalt-catalyzed butadiene rubber, after the preparation of the cis-butadiene rubber composition, it was visually observed the residue of sample onto the rotor and inner wall of the brabender, and the agglomeration or any white spots on the surface of the sample after rolling, and the visual inspection results are shown in Table 6.

In the same method as in Test Example 2, the prepared metallic acrylate composition was contained in a heat-sealable aluminum foil bag then compacted by a 4 kilogram weight flange at 50° C. oven to simulate the compaction and temperature conditions during the delivery or storage of the acrylic metal salt composition. After one month of compaction, the same procedure of the dispersion test was repeated and the results are shown in Table 6.

Table 6: The score results of metallic acrylate compositions of Examples 1 to 3 and Comparative Example 1 before and after compaction were mixed with cobalt-catalyzed butadiene rubber masterbatch to form a rubber composition.

| Nickel catalyst butadiene rubber(trade name) | Metallic Acrylate Composition | Initial Dispersion Test | | Dispersion Test after one month of compaction | |
|---|---|---|---|---|---|
| | | Equipment Adhesion | Surface Cohesion | Equipment Adhesion | Surface Cohesion |
| 1207G | Example 1 | 9 | 10 | 9 | 10 |
| | Example 2 | 9 | 10 | 9 | 10 |
| | Example 3 | 10 | 10 | 10 | 10 |
| | Comparative Example 1 | 6 | 6 | 4 | 6 |
| KBR01 | Example 1 | 6 | 8 | 6 | 8 |
| | Example 2 | 6 | 8 | 4 | 6 |
| | Example 3 | 9 | 10 | 9 | 10 |
| | Comparative Example 1 | 2 | 4 | 2 | 2 |

| Cobalt catalyst butadiene rubber(trade name) | Metallic Acrylate Composition | Initial Dispersion Test | | Dispersion Test after one month of compaction | |
|---|---|---|---|---|---|
| | | Equipment Adhesion | Surface Cohesion | Equipment Adhesion | Surface Cohesion |
| CB1221 | Example 1 | 6 | 10 | 4 | 6 |
| | Example 2 | 4 | 4 | 4 | 4 |
| | Example 3 | 8 | 10 | 6 | 8 |
| | Comparative Example 1 | 2 | 4 | 2 | 2 |
| CB1203 | Example 1 | 6 | 6 | 4 | 6 |
| | Example 2 | 6 | 6 | 6 | 6 |
| | Example 3 | 8 | 10 | 8 | 8 |
| | Comparative Example 1 | 2 | 4 | 2 | 2 |

Test Example 6: Dispersion Test of the Metallic Acrylate Composition Having Formula (II) (Mixed Ethylene-Propylene Rubber Masterbatch)

1. Preparation of the Mixed EPDM Rubber Masterbatch

The setting temperature and rotation speed of the brabender was 100° C. and 80 rpm, and EPDM, carbon black, zinc oxide and stearic acid were added in sequence, and then the processing oil was added slowly to make the above raw materials form a mixed EPDM rubber masterbatch, which was then subjected to cold press under pressure of 50 kg/cm$^2$ and pressed to form a sheet for use.

In the mixed EPDM rubber masterbatch, the contents of the raw material were 100 parts by weight of ethylene propylene diene monomer, 100 parts by weight of the processing oil, 50 parts by weight of the carbon black, 5 parts by weight of zinc oxide and 1 part by weight of stearic acid.

2. Dispersion Test of the Metallic Acrylate Compositions Having Formula (II)

The setting temperature and rotation speed of the brabender was 60° C. and 20 rpm. 100 parts by weight of EPDM rubber masterbatch were added and mixed for one minute, and then 20 parts by weight of metallic acrylate composition having Formula (II) and 0.3 parts by weight of dicumyl peroxide were added, pressed with a pressure rod and then mixed at a speed of 100 rpm for 1 minute, next, the speed was adjusted to 20 rpm for another 1-minute mixing to form an EPDM rubber composition, which was then pressed under pressure of 20 kg/cm$^2$ by a cold press to form a sheet having a thickness of 2 mm.

In order to observe the dispersion effect of the metallic acrylate composition in rubber, after completion of preparing the ethylene-propylene rubber composition, the results are shown in Table 7 in a manner similar score method to that of Test Example 2.

Table 7: The results of equipment adhesion and surface agglomeration of the rubber compositions formed by blending the metallic acrylate compositions of Examples 5 to 10 and Comparative Example 5 with EPDM masterbatch

| Rubber Formula | Metallic Acrylate Composition | Initial Dispersion Test | |
|---|---|---|---|
| | | Equipment Adhesion | Surface Agglomeration |
| EPDM rubber masterbatch | Example 5 | 6 | 8 |
| | Example 6 | 10 | 10 |
| | Example 7 | 10 | 10 |
| | Example 8 | 6 | 8 |
| | Example 9 | 10 | 10 |
| | Example 10 | 10 | 10 |
| | Comparative Example 5 | 2 | 2 |

3 The Method of Curing Curve Analysis 6 g of EPDM rubber composition was placed into a closed-type rheometer (manufacturer: Ektrontek, model: EKT-2000S) for curing curve analysis (control parameters 170° C./10 min/swing angle 0.5°), the minimum torque ($M_L$), maximum torque ($M_H$), scorch time (Ts2) and vulcanization time (Tc90) were recorded to compare the influence of dispersibility on the vulcanization process, and the results were listed in Table 8.

4. The Method of Film Vulcanization Molding and Mechanical Strength Analysis 30 g of EPDM rubber composition was weighted in the heat compression molding machine (manufacturer: Cometech, Model: QC-602A) at curing conditions of 170° C., 12 minutes, 100 kg/cm$^2$ to form a 120×120×2 mm of the test piece. After the test piece was cooled for 16 hours, the test piece was cut with a dumbbell-shaped cutting tool (ISO 37 type II) and then subjected to mechanical strength analysis by a tensile tester (model AI-7000S) at 500 mm/min, the number of tests should be at least three samples, and the test results are shown in Table 8.

Table 8: Vulcanization curve analysis of the ethylene-propylene-diene rubber resin compositions of Examples 5 to 10 and Comparative Example 5 and mechanical strength analysis after vulcanization molding.

|  | Analysis of Vulcanization Curve | | | | Study of Mechanical Strength | | |
| --- | --- | --- | --- | --- | --- | --- | --- |
|  | | | | | | Elongation | |
|  | Minimum torque (dN · m) | Maximum torque (dN · m) | Scorch Time (min) | Cure Time (min) | Tensile Strength (psi) | at Break (%) | 100% modulus (psi) |
| Example 5 | 0.29 | 4.69 | 1.6 | 5.4 | 494 | 475 | 135 |
| Example 6 | 0.29 | 4.92 | 1.4 | 5.5 | 512 | 454 | 164 |
| Example 7 | 0.27 | 3.85 | 2.3 | 5.2 | 408 | 572 | 126 |
| Example 8 | 0.28 | 4.75 | 1.5 | 5.3 | 511 | 489 | 138 |
| Example 9 | 0.27 | 4.57 | 1.6 | 5.3 | 514 | 487 | 165 |
| Example 10 | 0.26 | 4.37 | 1.7 | 5.4 | 463 | 475 | 165 |
| Comparative Example 5 | 0.29 | 4.53 | 1.7 | 5.5 | 459 | 518 | 123 |

According to Table 8, compared with the results of Comparative Example 5, the metallic acrylate composition of the present invention not only improves residue issue onto equipment and surface defects during mixing with the rubber, but also has a better dispersibility, and thus can be quickly and evenly dispersed in the rubber, increase the reactivity between the rubber and curing agent, so as to improve the crosslinking density of rubber and enhance the mechanical strength of the final product.

In summary, the metallic acrylate composition can effectively alleviate the problem of agglomeration caused by self-polymerization due to temperature or compaction during long-term storage and delivery, and has a better stability. In addition, compared with common dispersing auxiliaries in the industry, the metallic acrylate composition demonstrate good dispersibility in various catalyzed rubbers. Therefore, the present invention can solve the operational problems that the powder easily adheres to the equipment after mixing with auxiliaries and different rubbers, and there is no agglomeration or white spots on the surface of the flaky samples formed, which can increase reactivity between the rubber and the curing agent and the crosslinking density of rubbers, and thus improve the mechanical strength of the product.

What is claimed is:

1. A metallic acrylate composition comprising:
a metallic acrylate having the structure represented by Formula (I) or Formula (II) as follows:

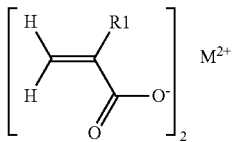

Formula (I)

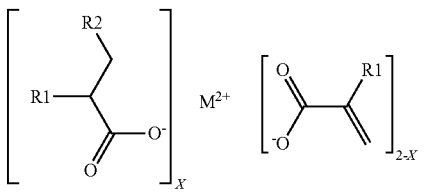

Formula (II)

wherein in Formula (I) and Formula (II), X is larger than 0 and less than 2, and M$^{2+}$ is zinc ion (Zn$^{2+}$), magnesium ion (Mg$^{2+}$) or calcium ion (Ca$^{2+}$);
R1 is a hydrogen group or a saturated alkyl group; and
R2 is

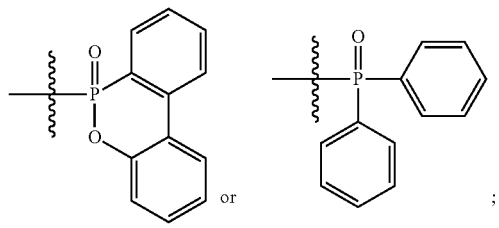 [SMILES: *P1(=O)Oc2ccccc2-c2ccccc21 ; *P(=O)(c1ccccc1)c1ccccc1]

and
a dispersant being polytetrafluoroethylene (PTFE) wax or PTFE-modified polyethylene wax, and the content of the dispersant being in the range from 0.1 weight percent to 5 weight percent based on the total weight of the metallic acrylate composition.

2. The metallic acrylate composition as claimed in claim 1, wherein the saturated alkyl group in Formula (I) has a carbon number of 1 to 6.

3. The metallic acrylate composition as claimed in claim 1, wherein X in Formula (II) is larger than 0 and less than or equal to 1.

4. A resin composition, comprising a polymer and the metallic acrylate composition as claimed in claim 1.

5. The resin composition as claimed in claim 4, wherein the amount of the metallic acrylate composition is 1 part to 50 parts, based on the total weight of the polymer being 100 parts.

6. The resin composition as claimed in claim 4, wherein the resin composition contains a neodymium catalyst, a nickel catalyst, a cobalt catalyst or a lithium catalyst.

7. The resin composition as claimed in claim 4, wherein the polymer is a vulcanized polymer.

8. The resin composition as claimed in claim 7, wherein the vulcanized polymer is selected from polyolefin, ethylene-α-olefin copolymer, ethylene-α-olefin-nonconjugated diene copolymer, polyethylene (PE), ethylene propylene rubber (EP), ethylene propylene diene monomer (EPDM), polybutene rubber (BR), polyisobutylene rubber (IIR), natural rubber (NR), polyisoprene rubber (IR), styrene-butadiene-styrene block copolymer (SBS), styrene-isoprene-styrene block copolymer (SIS), styrene butadiene rubber (SBR), hydrogenated styrene butadiene styrene block polymer (SBS-SEBS), nitrile rubber (NBR), polyolefin elastomer (POE) or any mixture thereof.

9. The resin composition as claimed in claim 8, wherein the resin composition contains an organic peroxide.

10. The resin composition as claimed in claim 9, where the organic peroxide is selected from alkyl peroxides, dialkyl peroxides, aromatic peroxides, peroxyesters, diperoxyketals, diacyl peroxides or peroxydicarbonates.

11. A preparation method of the metallic acrylate composition as claimed in claim 1, comprising the steps of:
   reacting an acrylic acid and a divalent metal oxide in a nonpolar solvent to obtain a first mixture;
   adding PTFE wax or PTFE-modified polyethylene wax to the first mixture to obtain the metallic acrylate composition.

12. The preparation method as claimed in claim 11, wherein the acrylic acid is reacted with the divalent metal oxide at a temperature between 30° C. and 100° C. to obtain the first mixture.

13. The preparation method as claimed in claim 11, wherein the molar ratio of the acrylic acid to the divalent metal oxide is between 1.4:1 and 2.1:1.

14. A preparation method of the metallic acrylate composition as claimed in claim 1, comprising the steps of:
   reacting the metallic acrylate and an organophosphorus oxide in a nonpolar solvent to obtain a first mixture;
   adding PTFE wax or PTFE-modified polyethylene wax to the first mixture to obtain the metallic acrylate composition.

15. The preparation method as claimed in claim 14, wherein the metallic acrylate composition is reacted with the organophosphorus oxide at a temperature between 30° C. and 100° C.

16. The preparation method as claimed in claim 14, wherein the molar ratio of the metallic acrylate composition to the organophosphorus oxide is between 1:0.05 and 1:2.

\* \* \* \* \*